(12) United States Patent
Jarrah

(10) Patent No.: US 7,112,043 B2
(45) Date of Patent: Sep. 26, 2006

(54) COMPRESSOR IMPELLER THICKNESS PROFILE WITH LOCALIZED THICK SPOT

(75) Inventor: Yousef M. Jarrah, Henrietta, NY (US)

(73) Assignee: General Motors Corporation, Detroit, MI (US)

( * ) Notice: Subject to any disclaimer, the term of this patent is extended or adjusted under 35 U.S.C. 154(b) by 355 days.

(21) Appl. No.: 10/652,735

(22) Filed: Aug. 29, 2003

(65) Prior Publication Data
US 2005/0047915 A1 Mar. 3, 2005

(51) Int. Cl.
F04D 29/66 (2006.01)
(52) U.S. Cl. .................... 416/183; 416/235; 416/236 A
(58) Field of Classification Search ................. 416/183, 416/185, 235, 236 R, 225
See application file for complete search history.

(56) References Cited

U.S. PATENT DOCUMENTS 4,865,520 A * 9/1989 Hetzel et al. ............ 416/236 R
6,905,309 B1 * 6/2005 Nussbaum et al. ......... 415/223

FOREIGN PATENT DOCUMENTS

WO  WO 8000468 A1 * 3/1980

OTHER PUBLICATIONS

Dresser-Rand; Isopac Compressor Impeller Upgrade; "Driving down operating costs by increasing compressor efficiency" (2000-2003); pp. 1-2.

Clean Dry Air, Inc.; Centrifugal Air Compressor Surge; "What word strikes fear in the heart of centrifugal compressor operators? SURGE!" (Aug. 2000); pp. 1-4.

Compressor Surge; "Dissection of Surge in a High Speed Centrifugal Compressor Using Digital PIV"; Mark P. Wernet and Michelle Bright; (Jan. 1999); pp. 1-2.

* cited by examiner

Primary Examiner—Edward K. Look
Assistant Examiner—Dwayne J White
(74) Attorney, Agent, or Firm—Harness, Dickey & Pierce, P.L.C.

(57) ABSTRACT

An air foil includes a leading edge, a trailing edge, a hub contour, and a tip contour, whereby the hub contour and tip contour extend between the leading and trailing edges to define a blade surface therebetween. A localized thick spot is disposed between the leading edge and the trailing edge and extends from a first point on the hub contour to a second point on the tip contour. The localized thick spot includes a generally sheared profile and is operable to provide the air foil with a desired strength while concurrently providing desired aerodynamic properties.

18 Claims, 3 Drawing Sheets

COMPRESSOR IMPELLER THICKNESS PROFILE WITH LOCALIZED THICK SPOT

FIELD OF THE INVENTION

The present invention relates to impellers for compressors and pumps and the like, and more particularly, to an improved blade design for an impeller.

BACKGROUND OF THE INVENTION

Impellers are widely used in a variety of applications to compress a fluid. For example, impellers are often used in air compressor applications for use in generating compressed air to power pneumatic tools and the like. Alternatively, impellers are used to compress a fluid for use in a pressurized system such as in supplying a pressurized fluid stream for use on a fire truck or pumping station. Further yet, such impellers are commonly used in the design and operation of aircraft engines, whereby a compressed fluid stream is provided via an impeller to propel an airplane in a desired direction. In any of the foregoing applications, it is desirable to provide an impeller capable of operating under varying flow conditions to provide a continuous supply of pressurized fluid, regardless of external forces.

As can be appreciated from the foregoing discussion, impellers are operable to compress a fluid stream for use in a plurality of applications. As previously discussed, one such application is an air compressor. Conventional compressors typically include an impeller, a diffuser, and a volute, whereby the diffuser is in fluid communication with both the impeller and the volute and is operable to transfer a compressed air stream from the impeller to the volute for use in an external system. The impeller commonly includes a plurality of blades that are operable to receive and compress an external air stream between a hub of the impeller and a stationary shroud. Specifically, the impeller captures the external air stream at an inducer disposed proximate to a leading edge of each blade such that the captured mass air flow is forced between the hub and the stationary shroud through rotation of the impeller. The inducer is generally operable to capture the external air stream and force it between the hub and the stationary shroud as the impeller is rotated due to the generally curved or arcuate shape of the leading edge of each blade.

As can be appreciated, as the air stream travels between each of the blades, the shape of the shroud and hub are such that the air stream is compressed prior to reaching the volute. The compressed air stream is received into the diffuser for distribution to the volute prior to being used by an external application such as a pneumatic tool or a vehicle engine or a fuel cell. The diffuser commonly includes a plurality of stationary vanes which are operable to diffuse the air stream from the impeller in an effort to increase the static pressure of the compressed air. Such increases in static pressure generally increase the pressure of the air stream, thereby providing a desired output of pressurized air from the compressor.

In compressor design, it is increasingly important to deliver a constant stream of pressurized air to ensure proper operation of an external device. As can be appreciated, interruption of a compressor can cause external devices, such as pneumatic tools, to seize and abruptly stop working. A common occurrence of such compressor failure is impeller blade fracture or blade cracking due to stresses imparted on the impeller blades through compression of an air stream. Such blade facture or cracking impedes the performance of the impeller as the requisite pressurized air cannot be delivered without first replacing the fractured or cracked impeller blade. Conventional air compressors commonly include an impeller disposed within a sealed housing such that replacement and repair of the impeller commonly requires a significant amount of time and accompanying expense when blade fracture or cracking occurs. As can be appreciated, such repairs can be costly both from the standpoint of requiring a replacement impeller and also from the standpoint that the compressor is unusable until the requisite repairs can be completed.

To obviate the need for impeller repair, conventional impeller designs have commonly incorporated impeller blades having an increased thickness to stave off blade cracking and fracture. In most cases, such increases in blade thickness come with an aerodynamic penalty. More particularly, by increasing the thickness of each blade in an effort to improve strength characteristics and limit blade fracture and cracking, aerodynamic performance of the blade is sacrificed as thinner blade profiles typically provide for improved aerodynamic performance and efficiency. In this manner, conventional impellers, and impeller blades, suffer from the disadvantage of sacrificing aerodynamic performance to meet requisite strength characteristics.

Therefore, an impeller incorporating an airfoil or blade which provides adequate structural support while concurrently providing optimum aerodynamic performance of each airfoil or blade is desirable in the industry.

SUMMARY OF THE INVENTION

Accordingly, an air foil is provided and includes a leading edge, a trailing edge, a hub contour, and a tip contour, whereby the hub contour and tip contour extend between the leading and trailing edges to define a blade surface therebetween. A localized thick spot is disposed between the leading edge and the trailing edge and extends from a first point on the hub contour to a second point on the tip contour. The localized thick spot includes a generally sheared profile and is operable to provide the air foil with a desired strength while concurrently providing desired aerodynamic properties.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
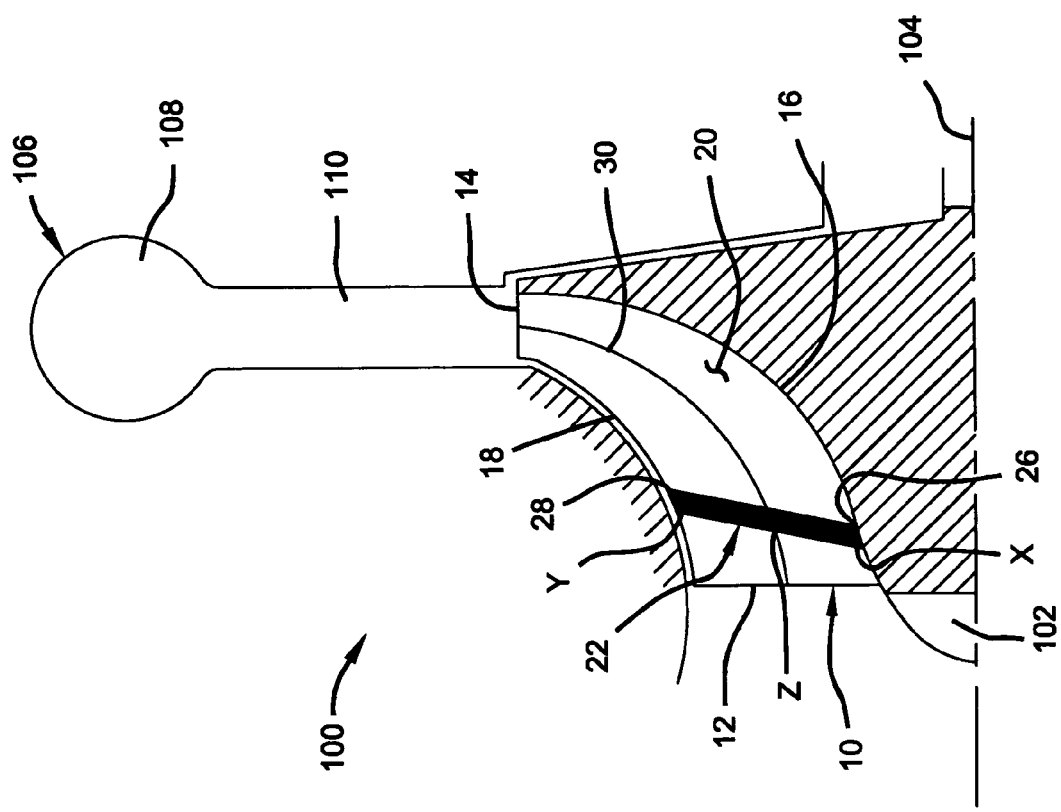
FIG. 1 is a sectional view of an air foil in accordance with the principals of the present invention incorporated into an impeller arrangement.

The following description of the preferred embodiments is merely exemplary in nature and is in no way intended to limit the invention, its application, or uses.

With reference to the figures, an airfoil 10 of an impeller is provided and includes a leading edge 12 operable to capture airflow and a trailing edge 14 formed on an opposite end from the leading edge 12 and operable to receive the airflow from the leading edge 12. In addition, the airfoil 10 includes hub contour 16 and a tip contour 18 extending between the leading edge 12 and trailing edge 14.

The leading edge 12 and trailing edge 14 serve to define an overall length of the airfoil 10 while the hub contour 16 and tip contour 18 serve to define an overall height of the airfoil 10, as best shown in FIG. 1. In this regard, the airfoil 10 includes a blade surface 20 extending along the length of the airfoil 10 between the leading edge 12 and the trailing edge 14 and between the hub contour 16 and tip contour 18. The blade surface 20 is operable to receive airflow from the leading edge 12 and transmit the flow to the trailing edge 14, as will be discussed further below.

Figure 3:
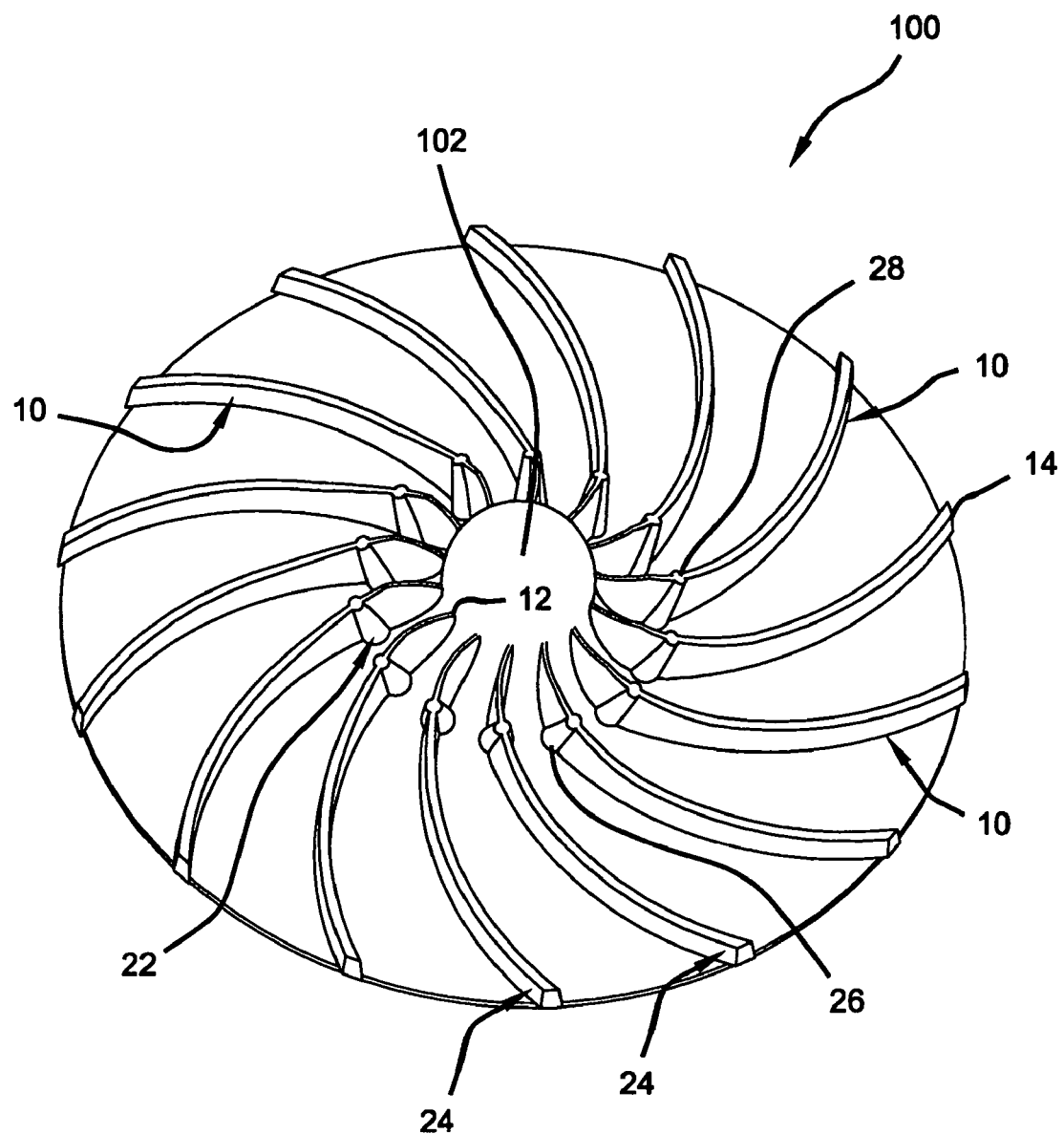
FIG. 3 is a perspective view of an impeller incorporating a plurality of air foils in accordance with the principals of the present invention.

The blade surface 20 defines the general shape of the airfoil 10. In one embodiment, the blade surface 20 is a generally sweeping, arcuate surface, as best shown in FIGS. 1 and 3. In this regard, the blade surface 20 is operable to direct the airflow from the leading edge 12 to the trailing edge 14 and to transmit a force accompanying the airflow along the blade surface 20. In this regard, the blade surface 20 is concurrently responsible for transmitting the airflow between the leading edge 12 and the trailing edge 14 and withstanding the accompanying forces associated with the flow of air.

The blade surface 20 further includes a localized thick spot 22 and a tapered surface 24, as best shown in FIGS. 1 and 3. The localized thick spot 22 is formed integrally with the blade surface 20 and extends between the hub contour 16 and the tip contour 18. More particularly, the localized thick spot 22 includes a hub junction 26 adjacent to, and abutting, the hub contour 16 and a tip junction 28 adjacent to the tip contour 18. The hub junction 26 is formed a distance "X" away from the leading edge 12, whereby the distance X is generally equivalent to 8–12% of a total length of the airfoil 10. The tip junction 28 is formed a distance "Y" away from the leading edge 12, whereby the distance Y is generally equivalent to 28–32% of the total length of the airfoil 10 as measured between the leading edge 12 and trailing edge 14.

Figure 2:
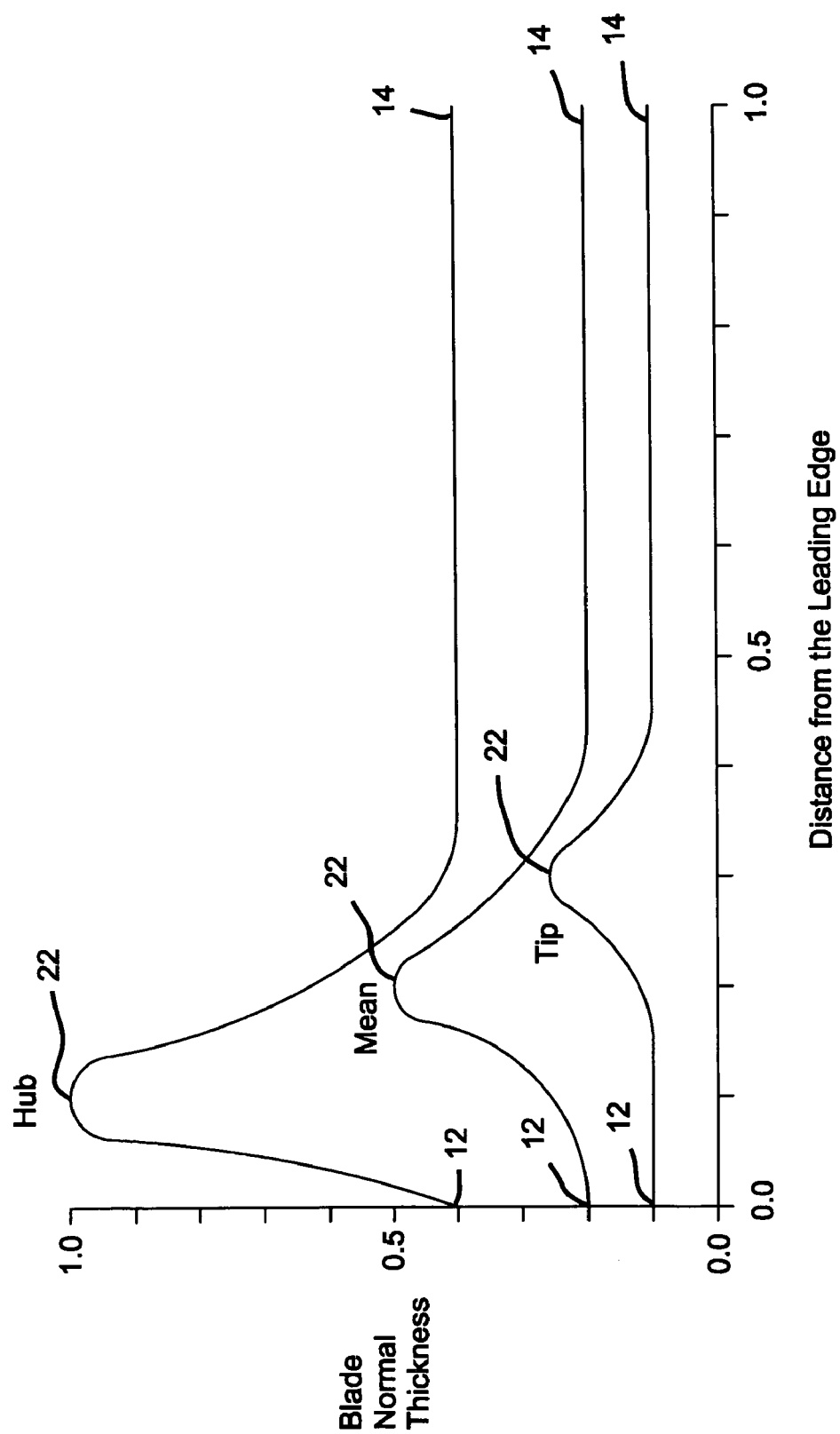
FIG. 2 is a graphical representation of the air foil of FIG. 1.

As described, the localized thick spot 22 includes a generally sheared or angular relationship relative to a mean axis 30 of the airfoil 10, as shown in FIGS. 1 and 2. In this regard, the localized thick spot 22 crosses the mean 30 at a distance "Z" away from the leading edge 12, whereby the distance Z is generally equivalent to 18–22% of the total length of the airfoil 10. In other words, the distance Z is disposed generally between the X and Y positions, as best shown in FIGS. 1 and 2. In this manner, the localized thick spot 22 is formed at a sheared or angled profile relative to the central axis 30.

The localized thick spot 22 is tapered between the hub contour 16 and tip contour 18, as graphically illustrated in FIG. 2. In this regard, the thickness of the localized thick spot 22 is greatest at the hub contour 16 and tapers as the localized thick spot 22 approaches the tip contour 18. Generally speaking, the thick spot 22 is reduced by a ratio of 2:1 moving from the hub contour 16 to the mean 30 and further reduced by a ratio of 2:1 moving from the mean 30 to the tip contour 18. In other words, the hub contour 16 to mean 30 ratio is substantially 2.0 having an acceptable range of 1.75–2.25 while the mean 30 to tip contour 18 ratio is similarly 2.0 having an acceptable range of 1.75–2.25.

FIG. 2 is a graphical representation of the hub 12 to mean 30 ratio and mean 30 to tip 18 ratio and provides an example of each ratio. For example, if the hub contour 16 is assigned a normalized thickness value of 1.0, the mean 30 would then have a normalized thickness value substantially equal to 0.5 due to the 2:1 ratio, previously discussed. In addition, if the normalized thickness value of the mean 30 is 0.5, the normalized thickness value of the tip contour 18 is substantially equal to 0.25, as graphically demonstrated in FIG. 2. In this regard, the localized thick spot 22 extends from the hub contour 16 at its thickest point to the tip contour 18 at its thinnest point.

The tapered surface 24 of the airfoil is disposed adjacent to the thick spot 22 and extends along the length of the airfoil 10, as shown in FIG. 3 and graphically represented in FIG. 2. The tapered surface 24 similarly includes a hub 16 to mean 30 ratio of 2:1 and a mean 30 to tip 18 ratio of 2:1. In this manner, the hub contour 16 to mean 30 ratio is substantially 2.0 having an acceptable range of 1.75–2.25 while the mean 30 to tip contour 18 ratio is similarly 2.0 having an acceptable range of 1.75–2.25.

As previously discussed, FIG. 2 is a graphical representation of the hub 16 to mean 30 ratio and mean 30 to tip 18 ratio. For example, if the hub contour 16 is assigned a normalized thickness value of 0.4 (as illustrated), the mean 30 would then have a normalized thickness value substantially equal to 0.2. In addition, if the normalized thickness value of the mean 30 is 0.2, the normalized thickness value of the tip contour 18 is substantially equal to 0.1, as graphically demonstrated in FIG. 2. In this regard, the tapered surface 24 extends from the hub contour 16 at its thickest point to the tip contour 18 at its thinnest point. As can be seen from FIG. 2, the localized thick spot 22 is approximately 2.5 times the thickness of the blade along the hub contour, mean axis and tip contour respectively.

With reference to FIGS. 1 and 3, the airfoil 10 is shown incorporated into an impeller 100. The impeller 100 includes a hub 102, a central axis of rotation 104, and a plurality of airfoils 10 disposed radially around the hub 102. The airfoils 10 are positioned around the hub 102 such that rotation of the impeller 100 around axis 104 causes the airfoils 10 to capture an air flow and transmit the air flow between the leading edge 12 and the trailing edge 14. As can be appreciated, such movement of the air flow between the leading edge 12 and trailing edge 14 compresses the air to a predetermined pressure.

The pressurized air flow is commonly received by a collecting assembly 106 having a diffuser 110 and a volute 108. The diffuser 110 and volute 108 cooperate to receive the pressurized air flow from the impeller 100 and deliver the pressurized stream to an external source. In this regard, the air flow is captured by the leading edge 12 of each airfoil 10 and is caused to travel along each airfoil 10 along the blade surface 20. Such travel along the blade surface 20 imparts a force on the airfoil 10 as the air travels between the leading edge 12 and the trailing edge 14.

Such forces are received by the blade surface 20 and are transmitted to the localized thick spot 22 to prevent fracture or cracking of the airfoil 10. In this manner, the localized thick spot 22 strengthens the airfoil 10 at a predetermined location along the blade surface 20 to account for the air pressure forces. As the localized thick spot 22 is formed at a predetermined position along the blade surface 20, the remainder of the blade surface 20 can be formed such that the aerodynamic performance of the airfoil 10 is optimized. In other words, the remainder of the airfoil 10 can be relatively thin without concern for fracture or cracking due to the position and thickness of the localized thick spot 22.

While the airfoil 10 has been described in an impeller application, it should be understood that such an airfoil design is applicable to other forms of turbo machinery such as, but not limited to, turbines, pumps, fans, and blowers. In each of the foregoing applications, strength and aerodynamic performance of a blade or airfoil can be concurrently optimized due to the placement and nature of the localized thick spot 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An airfoil of an impeller having a hub portion, comprising:
   a leading edge;
   a trailing edge;
   a hub contour extending along the hub portion;
   a tip contour; and
   a localized thick spot disposed between said leading edge and said trailing edge, said thick spot extending from a first point on said hub contour to a second point on said tip contour,
   wherein said first point is disposed a distance at or between 8–12% of a total length of the airfoil from said leading edge.

2. The airfoil of claim 1, wherein said second point is disposed at a distance at or between 28–32% of a total length of the tip contour of the airfoil from said leading edge.

3. The airfoil of claim 1, wherein a thickness ratio of the localized thick spot between said hub contour and said tip contour is roughly 4:1.

4. An airfoil of an impeller including a hub portion and an axis of rotation, the airfoil corn p rising:
   a leading edge disposed adjacent to the axis of rotation of the impeller and in contact with the hub portion along an entire length of said leading edge;
   a trailing edge disposed at an opposite end of the airfoil from said leading edge;
   a hub contour extending along a length of the airfoil between said leading edge and said trailing edge;
   a tip contour spaced apart from said hub contour and extending along a length of the airfoil between said leading edge and said trailing edge; and
   a localized thick spot disposed between said leading edge and said trailing edge and extending from a first point on said hub contour to a second point on said tip contour.

5. The airfoil of claim 4, wherein said first point is disposed a distance at or between 8–12% of a total length of the airfoil from said leading edge.

6. The airfoil of claim 4, wherein said second point is disposed at a distance at or between 28–32% of a total length of the tip contour of the airfoil from said leading edge.

7. The airfoil of claim 4, wherein a thickness ratio of the localized thick spot between said hub contour and said tip contour is roughly 4:1.

8. The airfoil of claim 4, further comprising a tapered surface defined by said hub contour and said tip contour.

9. The airfoil of claim 8, wherein said tapered surface extends from said hub contour to said tip contour.

10. The airfoil of claim 8, wherein said tapered surface extends from said leading edge to said trailing edge.

11. An airfoil of an impeller having a hub portion, the airfoil comprising:
    a mean axis extending along a length of the airfoil;
    a leading edge disposed adjacent to the;
    a trailing edge disposed at an opposite end of the airfoil from said leading edge;
    a hub contour extending along the hub portion between said leading edge and said trailing edge;
    a tip contour spaced apart from said hub contour and extending between said leading edge and said trailing edge; and
    a localized thick spot disposed between said leading edge and said trailing edge and extending from a first point on said hub contour to a second point on said tip contour and formed at an angle relative to said mean axis of the airfoil;
    wherein said second point is disposed at a distance at or between 28–32% of a total length of the tip contour of the airfoil from said leading edge.

12. The airfoil of claim 11, wherein said first point is disposed a distance at or between 8–12% of a total length of the airfoil from said leading edge.

13. The airfoil of claim 11, wherein a thickness ratio of the localized thick spot between said hub contour and said tip contour is roughly 4:1.

14. The airfoil of claim 11, further comprising a tapered surface defined by said hub contour and said tip contour.

15. The airfoil of claim 14, wherein said tapered surface extends from said hub contour to said tip contour.

16. The airfoil of claim 14, wherein said tapered surface extends from said leading edge to said trailing edge.

17. The airfoil of claim 11, wherein said localized thick spot is formed at an angle relative to said axis of rotation of the airfoil.

18. The airfoil of claim 11, wherein said localized thick spot includes a larger cross-sectional area at said hub contour than at said tip contour.

* * * * *